United States Patent [19]

Brizgys et al.

[11] 4,423,180

[45] Dec. 27, 1983

[54] ORGANIC ZIRCONIUM COMPOUNDS TO REDUCE VISCOSITY OF FILLED LIQUID POLYMERS

[75] Inventors: Bernardas Brizgys, Southgate; James A. Gallagher, Grosse Ile, both of Mich.

[73] Assignee: BASF Wyandotte Corporation, Wyandotte, Mich.

[21] Appl. No.: 407,654

[22] Filed: Aug. 12, 1982

[51] Int. Cl.³ .......................... C08K 5/06; C08K 5/09
[52] U.S. Cl. .................................. 524/394; 524/396; 524/398; 524/590; 524/783; 524/839
[58] Field of Search ............... 524/394, 396, 398, 590, 524/783, 839; 528/56

[56] References Cited

U.S. PATENT DOCUMENTS

| | | | |
|---|---|---|---|
| 2,933,462 | 4/1960 | Fischer | 528/56 |
| 3,673,159 | 6/1972 | Dijkhuizen et al. | 528/55 |
| 3,736,298 | 5/1973 | Schmit et al. | 528/56 |
| 4,087,402 | 5/1978 | Monte et al. | 524/239 |
| 4,122,046 | 10/1978 | Waldmann | 528/56 |
| 4,216,107 | 8/1980 | Vogt et al. | 252/182 |
| 4,312,971 | 1/1982 | Gallagher et al. | 528/56 |

*Primary Examiner*—Ronald W. Griffin
*Attorney, Agent, or Firm*—Norbert M. Lisicki

[57] ABSTRACT

Curable compositions and a process for the preparation of a low viscosity, filled liquid polymer having active hydrogen-containing groups are disclosed. An organic zirconium compound lowers the viscosity of a combination of a liquid polymer and an inorganic filler.

12 Claims, No Drawings

ORGANIC ZIRCONIUM COMPOUNDS TO REDUCE VISCOSITY OF FILLED LIQUID POLYMERS

BACKGROUND OF THE INVENTION

1. Field of the Invention

This invention relates to the preparation of polyurethanes including solid, non-cellular, and foamed urethanes both rigid and flexible.

2. Description of the Prior Art

It is known to manufacture polyurethanes using organic zirconium compounds as catalysts from U.S. Pat. No. 3,673,159. In this reference, there is disclosed the use of zirconium alcoholates or phenylates. It is also known from U.S. Pat. No. 4,122,046 to utilize organic compounds containing zirconium as a catalyst for the polymerization of acrylamide or mixtures of acrylamide and at least one ethylenically unsaturated monomer copolymerizable therewith.

It is also known from U.S. Pat. No. 4,087,402 and U.S. Pat. No. 4,216,107 to utilize organic titanium compounds to reduce viscosity in liquid polymers whether filled with inorganic fillers or unfilled.

SUMMARY OF THE INVENTION

It is an object of the invention to provide a process for the preparation of polyurethanes utilizing a liquid polymer containing at least 2 active hydrogen atoms per molecule as a reactant in admixture with an organic polyisocyanate, wherein said liquid polymer is filled with an inorganic filler and contains an organic zirconium compound to attain a reduction in viscosity as compared to a similar mixture without said zirconium compound.

DETAILED DESCRIPTION OF THE INVENTION AND THE PREFERRED EMBODIMENTS

It has been found that organic zirconium compounds which are dispersible or soluble in liquid polymers comprising organic compounds having at least 2 active hydrogen-containing groups, as determined by the Zerewitinoff method and more specifically polyester or polyether polyols are effective in reducing the viscosity of said polyols containing inorganic fillers. The organic zirconium compounds which act to reduce the viscosity of said polyols are selected from the group consisting of zirconium tetraacetyl acetonate and zirconium salts of aliphatic, arylaliphatic and aromatic mono- and di-carboxylic saturated and unsaturated acids. Said aliphatic carboxylic acids have carbon chain lengths of 1 to about 18 carbon atoms, said aromatic carboxylic acids contain 1 to 3 aromatic rings, and said arylaliphatic carboxylic acids have 1 to about 18 aliphatic carbon atoms and 1 to 3 aromatic rings.

Representative aliphatic carboxylic acids are: formic, acetic, propionic, butyric, valeric, caproic, caprylic, capric, lauric, myristic, palmitic, stearic, oleic, neodecanoic, and cyclohexane carboxylic acid. Representative aromatic carboxylic acids are: benzoic, napthenic, phthalic, isophthalic, and terephthalic acid. Representative arylaliphatic carboxylic acids are: phenylacetic, and toluic acid. Preferably the zirconium compounds are selected from the group consisting of zirconium neodecanoate, zirconium tetraacetyl acetonate, zirconium naphthenate, zirconium tallate, zirconium isooctate, zirconium oleate, zirconium laurate, zirconium stearate, zirconium acetate, and zirconium phthalate.

The zirconium compounds of the invention are used in an effective viscosity reducing amount in conjunction with an inorganic filler and at least one of a liquid polymer, preferably a polyether polyol or a polyester polyol. The amount of the zirconium compounds of the invention which is used is preferably about 0.2 percent to about 10 percent by weight based upon the weight of the polyether or polyester polyol, most preferably about 0.5 percent to about 5 percent by weight based upon the weight of the polyether or polyester polyol.

The polyurethanes prepared by the process of the present invention generally comprise the reaction product of an organic polyisocyanate and a liquid polymer. In addition to the above-mentioned materials, generally a filler and a pigment as well as a curing agent can be employed. If it is desired to prepare a polyurethane foam, then, in addition, a blowing agent and a stabilizer are generally employed. Alternatively, instead of using a blowing agent, a tertiary amine catalyst can be utilized to promote the water-isocyanate reaction to produce carbon dioxide as a blowing agent. It is to be understood that the particular adjuncts employed in the preparation of polyurethane reaction products are well known in the art and their use varies according to the products desired. The ratio of isocyanate groups to hydroxyl groups in the solid and foamed polyurethanes produced using the co-catalysts of the invention is generally 0.9:1.0 to about 1.5:1.0, preferably about 1.05:1.0 to about 1.2:1.0, and most preferably about 1.05:1.0 or, approximately a stoichiometric amount of each of said reactants.

Illustrative organic polyisocyanates which can be employed in accordance with the present invention include aromatic, aliphatic, and cycloaliphatic polyisocyanates and combinations thereof. Representative of these types are the diisocyanates such as m-phenylene diisocyanate, tolylene-2,4-diisocyanate, tolylene-2,6-diisocyanate, mixtures of 2,4- and 2,6-diisocyanate, hexamethylene-1,6-diisocyanate, tetramethylene-1,4-diisocyanate, cyclohexane-1,4-diisocyanate, hexahydrotolylene diisocyanate (and isomers), naphthylene-1,5-diisocyanate, 1-methoxyphenyl-2,4-diisocyanate, diphenylmethane-4,4'-diisocyanate, 4,4'-biphenylene diisocyanate, 3,3'-dimethoxy-4,4'-biphenyl diisocyanate, and 3,3'-dimethyldiphenylmethane-4,4'-diisocyanate; the triisocyanates such as 4,4',4"-triphenylmethane triisocyanate, polymethylene polyphenylisocyanate, and tolylene 2,4,6-triisocyanate; and the tetraisocyanates such as 4,4'-dimethyldiphenylmethane 2,2',5,5'-tetraisocyanate. Especially useful because of their availability and properties are tolylene diisocyanate, diphenylmethane-4,4'-diisocyanate, and polymethylene polyphenylisocyanate.

Crude polyisocyanate also can be used in the compositions of the present invention, such as crude toluene diisocyanate obtained by the phosgenation of a mixture of toluene diamines or crude diphenylmethane isocyanate obtained by the phosgenation of crude diphenylmethyl diamine. The preferred unreacted or crude isocyanates are disclosed in U.S. Pat. No. 3,215,652, incorporated herein by reference.

As used in the present invention, the term "organic polyisocyanate" also includes isocyanate-terminated polyurethane prepolymers which are prepared by the reaction of an excess amount of any of the above-mentioned organic polyisocyanates with a liquid polymer Any of the liquid polymers discussed below can be used.

Representative of the liquid polymers which can be employed as reactants alone or in admixture in accordance with the present invention are those polyols having at least two active hydrogen atoms per molecule. The term "active hydrogen atoms" refers to hydrogen atoms which, because of their position in the molecule, display activity according to the Zerewitinoff test as described by Kohler in *J. Am. Chem. Soc.*, 49, 3181 (1927). Representative liquid polymers include polyhydroxyl-containing polyesters, polyalkylene polyether polyols, polyhydroxy-terminated polyurethane polymers, polyhydroxyl-containing phosphorus compounds, aliphatic polyols, and alkylene oxide adducts of polyhydric polythioethers, polyacetals, aliphatic thiols, ammonia, and amines including aromatic, aliphatic, and heterocyclic amines, as well as mixtures thereof. Alkylene oxide adducts of compounds which contain two or more different groups within the above-defined classes can also be used such as amino alcohols which contain an amino group and a hydroxyl group. Also alkylene oxide adducts of compounds which contain one —SH group and one —OH group as well as those which contain an amino group and a —SH group can be used.

Any suitable hydroxyl-containing polyester can be used as a reactant such as those polyesters which are obtained from the reaction of polycarboxylic acids with polyhydric alcohols. Any suitable polycarboxylic acid can be used to prepare said polyester such as oxalic acid, malonic acid, succinic acid, glutaric acid, adipic acid, pimelic acid, suberic acid, azelaic acid, sebacic acid, maleic acid, fumaric acid, glutaconic acid, α-hydromuconic acid, β-hydromuconic acid, α-butyl-α-ethyl-glutaric acid, α,β-diethylsuccinic acid, isophthalic acid, terephthalic acid, hemimellitic acid, and 1,4-cyclohexane-dicarboxylic acid.

Any suitable polyhydric alcohol including both aliphatic and aromatic can be used to prepare said polyester such as ethylene glycol, 1,3-propylene glycol, 1,2-propylene glycol, 1,4-butylene glycol, 1,3-butylene glycol, 1,2-butylene glycol, 1,5-pentane diol, 1,4-pentane diol, 1,3-pentane diol, 1,6-hexane diol, 1,7-heptane diol, glycerol, 1,1,1-trimethylolpropane, hexane-1,2,6-triol, α-methyl glucoside, pentaerythritol, and sorbitol. Also included with the term "polyhydric alcohol" are compounds derived from phenol such as 2,2-bis(4,4'-hydroxyphenyl)propane, commonly known as Bisphenol A.

Any suitable polyalkylene polyether polyol can be used as a reactant such as the polymerization product of an alkylene oxide or of an alkylene oxide with a polyhydric alcohol. Any suitable polyhydric alcohol can be used as a reactant such as those disclosed above for use in the preparation of the hydroxyl-containing polyesters (polyester polyol). Any suitable alkylene oxide can be used such as ethylene oxide, propylene oxide, butylene oxide, amylene oxide, and heteric or block copolymers of these oxides. The polyalkylene polyether polyols may be prepared from other starting materials such as tetrahydrofuran and alkylene oxide-tetrahydrofuran copolymers; epihalohydrins such as epichlorohydrin; as well as aralkylene oxides such as styrene oxide. The polyalkylene polyether polyols can have either primary or secondary hydroxyl groups and, preferably, are polyethers prepared from alkylene oxides having from two to six carbon atoms such as polyethylene ether glycols, polypropylene ether glycols, and polybutylene ether glycols. The polyalkylene polyether polyols can be prepared by any known process such as, for example, the process disclosed by Wurtz in 1859 and by the *Encyclopedia of Chemical Technology*, vol. 7, pp. 257–262, published by Interscience Publishers, Inc. (1951) or in U.S. Pat. No. 1,922,459. Polyethers which are prepared include the alkylene oxide addition products of trimethylolpropane, glycerine, pentaerythritol, sucroses, sorbitol, propylene glycol, and 2,2-bis(4,4'-hydroxyphenyl)-propane and blends thereof having equivalent weights of from 250 to 5,000. Preferred polyalkylene polyether polyols are propylene oxide-trimethylolpropane triol and propylene oxide-propylene glycol diol.

Suitable polyhydric polythioethers which can be condensed with alkylene oxides include the condensation product of thiodiglycol or mixtures of the reaction product of a dihydric alcohol, such as disclosed above for the preparation of the hydroxyl-containing polyesters, with any other suitable thioether glycol.

The hydroxyl-containing polyester can also be a polyester amide such as those which are obtained by including some amine or amino alcohol in the reactants for the preparation of polyesters. Polyester amides can be obtained by condensing an amino alcohol such as ethanolamine with the polycarboxylic acids set forth above or they can be made using the same components that make up the hydroxy-containing polyester with only a portion of the components being a diamine such as ethylene diamine.

Suitable polyacetals which can be condensed with alkylene oxides include the reaction product of formaldehyde or other suitable aldehyde with a dihydric alcohol or an alkylene oxide such as those disclosed above.

Suitable aliphatic thiols which can be condensed with alkylene oxides include alkane thiols containing at least two —SH groups such as 1,2-ethane dithiol, 1,2-propane dithiol, 1,3-propane dithiol, and 1,6-hexane dithiol; alkene thiols such as 2-butene-1,4-dithiol; and alkyne thiols such as 3-hexyne-1,6-dithiol.

Other compounds which do not necessarily fit within any of the previously set forth classes of compounds which are quite suitable in the production of isocyanate-terminated prepolymers include the hydroxy-terminated prepolymer made by reacting an isocyanate with several moles of an alkylene glycol. The above-described polyols used in the invention can be used alone or in mixtures.

The organic zirconium compounds of the invention can be utilized in combination with well known catalysts for the preparation of polyurethanes. Organic compounds such as the organo-mercuric compounds are known to catalyze the reaction of an organic polyisocyanate and a compound having active hydrogen atoms. Useful organo-mercuric catalysts are disclosed in U.S. Pat. No. 3,583,945, U.S. Pat. No. 3,927,053, U.S. Pat. No. 2,692,204 and U.S. Pat. No. 3,642,044, all of which are hereby incorporated by reference.

The following examples illustrate the various aspects of the invention but are not intended to limit it. When not otherwise specified throughout this specification and claims, temperatures are given in degrees centigrade, and parts, percentages and proportions are by weight.

EXAMPLE 1

(Comparative example, forming no part of this invention)

A filled polyether polyol composition was prepared as follows. To 543 grams of a polyether polyol having an average molecular weight of 2,000 prepared by oxypropylating propylene glycol there was added 253 grams of a filler composed of calcined clay sold under the trademark SATINTONE NO. 2. Thereafter, 4 grams of a yellow iron oxide pigment and 1.2 grams of a phenyl mercury carboxylate containing 45 percent by weight mercury sold under the trademark COSAN 27 were added and the ingredients were mixed in a beaker using a high shear laboratory mixer. Upon attaining homogeneity, the viscosity was measured with a Brookfield viscometer utilizing a single spindle at speeds of 2, 4, 10 and 20 rpm. Test results are shown in the following table.

EXAMPLE 2

Example 1 was repeated except that 2.5 grams of zirconium neodecanoate containing 18 percent by weight zirconium was added to the mixture prior to mixing in a beaker with a high shear laboratory mixer. The homogeneous sample obtained was measured for viscosity and the results are shown in the following table.

EXAMPLE 3

(Comparative example, forming no part of this invention)

Example 1 was repeated omitting the phenyl mercury carboxylate catalyst. The viscosity of the homogeneous mixture obtained is indicated in the following table.

EXAMPLE 4

Example 3 was repeated except that 2.5 grams of zirconium neodecanoate containing 16 percent by weight zirconium was added to the mixture prior to mixing on a high shear laboratory mixer. Viscosity test results are shown in the following table.

EXAMPLE 5

(Comparative example, forming no part of this invention)

To 545 grams in a beaker of a polyol having an average molecular weight of 2,000 prepared by oxypropylating propylene glycol there was added 253 grams of talc and 4 grams of a yellow iron oxide pigment. The resulting mixture was thoroughly mixed on a high shear laboratory mixer to obtain a homogeneous mixture. The viscosity of the mixture was measured using a Brookfield viscometer and the results are shown in the table below.

EXAMPLE 6

Example 5 1 was repeated except that 2.5 grams of zirconium neodecanoate containing 16 percent by weight zirconium was added to the mixture in a beaker prior to mixing the ingredients on a high shear laboratory mixer to obtain a homogeneous mixture. The viscosity of the mixture was obtained and the results are shown in the following table.

EXAMPLE 7

(Comparative example, forming no part of this invention)

To 68 grams of a polyol having an average molecular weight of 2,000 prepared by oxypropylating propylene glycol there were added 32 grams of a filler composed of calcined clay sold under the trademark SATINTONE NO. 2 and a phenyl mercury carboxylate containing 45 percent by weight mercury sold under the trademark COSAN 27. The mixture was homogenized on a high shear laboratory mixer and subsequently the viscosity was measured. These results are shown in the following table.

EXAMPLE 8

Example 7 was repeated except that 0.2 grams of zirconium acetyl acetonate was added prior to mixing the ingredients on a high shear laboratory mixer. The viscosity of the homogeneous mixture was measured and the results are shown in the following table.

TABLE

| Brookfield Viscosity @ 25° C. (cps) Spindle speed (rpm) | Viscosity of Filled Polyether Polyols Example | | | | | | | |
|---|---|---|---|---|---|---|---|---|
| | 1 | 2 | 3 | 4 | 5 | 6 | 7 | 8 |
| 2 | 9,500 | 4,500 | 21,600 | 4,400 | 304,000 | 128,000 | 13,000 | 8,600 |
| 4 | 6,250 | 2,400 | 12,600 | 3,400 | 172,000 | 72,000 | — | — |
| 10 | 3,800 | 2,200 | 7,900 | 2,400 | 100,000 | 42,000 | — | — |
| 20 | 2,850 | 1,720 | 5,100 | 1,900 | 60,000 | 25,000 | 3,200 | 2,450 |

While this invention has been described with reference to certain specific embodiments, it will be recognized by those skilled in the art that many variations are possible without departing from the scope and spirit of the invention and it will be understood that it is intended to cover all changes and modifications of the invention disclosed herein for the purposes of illustration which do not constitute departures from the spirit and scope of the invention.

The embodiments of the invention in which an exclusive property or privilege is claimed are defined as follows:

1. A composition useful in the preparation of a polyurethane comprising an inorganic filler, a liquid polymer containing at least two active hydrogen-containing groups per molecule, as determined by the Zerewitinoff Method, and an effective amount of a viscosity reducing organic zirconium compound selected from the group consisting of zirconium tetraacetylacetonate and the zirconium salts of aliphatic, aromatic and arylaliphatic carboxylic acids, wherein said aliphatic carboxylic acids have 1 to about 18 carbon atoms; said aromaic carboxylic acids have 1 to 3 aromatic rings; and said arylaliphatic carboxylic acids have 1 to about 18 aliphatic carbon atoms and 1 to 3 aromatic rings.

2. The composition of claim 1 wherein said organic compound containing at least two active hydrogen-containing groups is selected from the group consisting of polyester polyols, polyether polyols, and mixtures thereof.

3. The composition of claim 2 wherein said organic zirconium compound is selected from at least one of the group consisting of zirconium neodecanoate, zirconium naphthenate, zirconium tallate, zirconium isooctate, zirconium oleate, zirconium laurate, zirconium stearate, zirconium acetate, and zirconium phthalate.

4. The composition of claim 3 wherein said organic zirconium compound is present in the amount of about 0.2 to about 10 weight percent based on the weight of said polyether or polyester polyol.

5. The composition of claim 4 wherein said polyether polyol is a polyalkylene polyether polyol.

6. The composition of claim 5 wherein said polyalkylene polyether polyol is at least one of a propylene oxide adduct of trimethylolpropane or a propylene oxide adduct of propylene glycol.

7. A process for reducing the viscosity of a composition useful in the preparation of a polyurethane, said process comprising adding an effective amount of a viscosity reducing organic zirconium compound to an inorganic filler and a liquid polymer containing at least two active hydrogen-containing groups per molecule, as determined by the Zerewitinoff Method, wherein said zirconium compound is selected from the group consisting of zirconium tetraacetylacetonate and zirconium salts of aliphatic, aromatic, and arylaliphatic carboxylic acids and wherein said aliphatic carboxylic acids have 1 to about 18 carbon atoms, said aromatic carboxylic acids have 1–3 aromatic rings and said arylaliphatic carboxylic acids have 1 to about 18 aliphatic carbon atoms and 1 to 3 aromatic rings.

8. The process of claim 7 wherein said liquid polymer containing at least two active hydrogen-containing groups is selected from the group consisting of at least one of polyether polyols and polyester polyols.

9. The process of claim 8 wherein said zirconium compound is selected from the group consisting of at least one of zirconium neodecanoate, zirconium naphthenate, zirconium phthalate, zirconium isooctate, zirconium oleate, zirconium laurate, zirconium stearate, zirconium acetate, and zirconium phthalate.

10. The process of claim 9 wherein said zirconium compound is present in the amount of about 0.2 to about 10 percent by weight based upon weight of the polyester or polyether polyol.

11. The process of claim 10 wherein said polyol is a polyalkylene polyether polyol.

12. The process of claim 11 wherein said polyalkylene polyether polyol is at least one of a propylene oxide adduct of trimethylolpropane or a propylene oxide adduct of propylene glycol.

* * * * *